(12) United States Patent
Jordan et al.

(10) Patent No.: US 9,952,762 B2
(45) Date of Patent: Apr. 24, 2018

(54) TACTILE INTERFACE SYSTEM FOR MANIPULATION OF A TOUCH SCREEN

(75) Inventors: J. Bern Jordan, Madison, WI (US); David P. Kelso, Madison, WI (US); Gregg C. Vanderheiden, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 589 days.

(21) Appl. No.: 13/589,628

(22) Filed: Aug. 20, 2012

(65) Prior Publication Data

US 2014/0049481 A1 Feb. 20, 2014

(51) Int. Cl.
| G09G 5/00 | (2006.01) |
| G06F 3/0488 | (2013.01) |
| G06F 3/039 | (2013.01) |

(52) U.S. Cl.
CPC .......... *G06F 3/04886* (2013.01); *G06F 3/039* (2013.01)

(58) Field of Classification Search
None
See application file for complete search history.

(56) References Cited

U.S. PATENT DOCUMENTS

| D310,820 S | 9/1990 | Watson et al. |
| 4,989,610 A | 2/1991 | Patton et al. |
| D321,215 S | 10/1991 | Shamis |
| 5,155,806 A | 10/1992 | Hoeber et al. |
| D348,065 S | 6/1994 | Madill et al. |
| D348,435 S | 7/1994 | Fairnelli et al. |
| D354,751 S | 1/1995 | Hutcheson |
| D359,737 S | 6/1995 | Madill et al. |
| D364,860 S | 12/1995 | Giebler et al. |
| D370,663 S | 6/1996 | Swain et al. |
| D371,550 S | 7/1996 | Tomkowicz |
| D372,704 S | 8/1996 | Nelson |
| 5,584,054 A * | 12/1996 | Tyneski et al. ............... 455/566 |
| D380,737 S | 7/1997 | Weir et al. |
| D388,769 S | 1/1998 | Pritchard et al. |
| 5,760,824 A | 6/1998 | Hicks, III |
| D422,971 S | 4/2000 | Leib |
| 6,067,081 A | 5/2000 | Hahlganss et al. |
| 6,073,033 A | 6/2000 | Campo |
| 6,162,059 A | 12/2000 | Murphy et al. |

(Continued)

FOREIGN PATENT DOCUMENTS

EM 000154042-0001 3/2004

*Primary Examiner* — William Boddie
*Assistant Examiner* — Alecia D English
(74) *Attorney, Agent, or Firm* — Boyle Fredrickson, S.C.

(57) ABSTRACT

An interface system that allows for tactile manipulation of a touch screen for people with disabilities and which provides appropriate tactile marking for the action they wish to carry out and that may afford a sensation that a button is being pressed to a user, is provided. The system includes a touch screen and a tactile button assembly that extends over at least a portion of the touch screen. The tactile button assembly includes tactile buttons with tactile indicia that can be felt by a user. The tactile buttons are arranged with respect to the touch screen so that when a tactile button is pressed by a user, a contact end of the tactile button contacts a button on the touch screen to perform a predetermined task associated with pressing such button on the touch screen.

21 Claims, 7 Drawing Sheets

(56) References Cited

U.S. PATENT DOCUMENTS

| | | |
|---|---|---|
| D436,579 S | 1/2001 | Mayo et al. |
| D451,482 S | 12/2001 | Vanderheiden et al. |
| D455,776 S | 4/2002 | Gardner |
| 6,384,743 B1 | 5/2002 | Vanderheiden et al. |
| 6,415,164 B1 | 7/2002 | Blanchard et al. |
| 6,492,978 B1 * | 12/2002 | Selig et al. ............. 345/173 |
| D469,108 S | 1/2003 | Lorenzo |
| 6,624,803 B1 | 9/2003 | Vanderheiden et al. |
| D490,780 S | 6/2004 | Mayo et al. |
| D496,645 S | 9/2004 | Yoo et al. |
| D507,244 S | 7/2005 | Mayo et al. |
| D510,074 S | 9/2005 | Larson et al. |
| 6,999,066 B2 | 2/2006 | Litwiller |
| D517,999 S | 3/2006 | Merritt et al. |
| D535,627 S | 1/2007 | Merritt et al. |
| D538,756 S | 3/2007 | Mayo et al. |
| D542,226 S | 5/2007 | Spira |
| D543,159 S | 5/2007 | Merritt et al. |
| D547,743 S | 7/2007 | Kim et al. |
| D549,183 S | 8/2007 | Hewson et al. |
| D554,073 S | 10/2007 | Mayo et al. |
| 7,277,081 B2 * | 10/2007 | Ukita et al. ............. 345/156 |
| D558,277 S | 12/2007 | Luciano, Jr. et al. |
| D561,156 S | 2/2008 | Jung et al. |
| D576,566 S | 9/2008 | Wu et al. |
| 7,489,303 B1 | 2/2009 | Pryor |
| D602,458 S | 10/2009 | Fasching |
| D603,865 S | 11/2009 | Jordan et al. |
| D613,746 S | 4/2010 | Jordan et al. |
| D633,506 S | 3/2011 | Jordan et al. |
| 7,978,181 B2 | 7/2011 | Westerman |
| 8,115,741 B2 * | 2/2012 | Jordan et al. ............. 345/173 |
| 8,411,037 B2 * | 4/2013 | Larsen ............. G06F 3/0202 345/168 |
| 8,462,133 B2 * | 6/2013 | Lynch et al. ............. 345/174 |
| 2003/0040340 A1 | 2/2003 | Smethers |
| 2003/0046451 A1 | 3/2003 | Prabhakam |
| 2003/0058139 A1 | 3/2003 | Sakurai |
| 2004/0119685 A1 | 6/2004 | Harries et al. |
| 2006/0022955 A1 | 2/2006 | Kennedy |
| 2006/0026536 A1 | 2/2006 | Hotelling et al. |
| 2006/0172266 A1 | 8/2006 | Rogers et al. |
| 2007/0212668 A1 | 9/2007 | Takami et al. |
| 2008/0204426 A1 | 8/2008 | Hotelling et al. |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0231610 A1 | 9/2008 | Hotelling et al. |

* cited by examiner

TACTILE INTERFACE SYSTEM FOR MANIPULATION OF A TOUCH SCREEN

REFERENCE TO GOVERNMENT GRANT

This invention was made with government support under H133E080022 awarded by the US Department of Education. The government has certain rights in the invention.

FIELD OF THE INVENTION

The invention relates generally to human-machine interfaces (HMIs) and, in particular, to a tactile-based interface system for manipulation of a touch screen which provides a user with the sensation that an actual button is being pressed.

BACKGROUND AND SUMMARY OF THE INVENTION

The electronic touch screen is representative of current innovative HMIs for electronic devices. With a touch screen, the user enters data by touching virtual buttons displayed on the computer display. With a touch screen system, the type, size, and number of the virtual buttons may be readily changed by changing the computer's program without changes in the associated hardware. Thus, the touch screen system offers a user-interface that may be flexibly tailored to a particular application. The ability to divide virtual buttons among different screens and to display only those screens needed by the user's particular task can simplify data entry. The combination of text and graphical elements on the screen, along with the virtual buttons, can help to further guide the user through the steps of data input.

Normally, a touch screen system uses a touch screen panel which is placed directly over the viewing area of a standard computer display, for example, a cathode ray tube (CRT) or a liquid crystal display (LCD). The touch screen panel provides a signal to a computer associated with the computer display indicating where on the surface of the display a stylus or finger is placed. This signal may be generated, for example, by acoustic systems detecting absorption of sound by a finger on the surface of the display; by systems using crossed beams of infrared light arrayed along x and y axes which are broken by the finger; or by laminated transparent electrodes which are physically compressed against each other to provide a point electrical contact that may be interpreted as an x and y coordinate. Frequently, a touch screen will be used with a computer contained within a device to be used by the public. The computer may have so-called multi-media capabilities providing both a visual and an audio program intended to help members of the public obtain information or directions.

Despite the advantage of touch screen systems in many applications, like many novel interface controls, they may present a barrier to many people with disabilities. Those with impaired vision perceive only the featureless surface of the display screen knowing that it may contain one or more virtual buttons of arbitrary placement and function. Those unfamiliar with the language of the legends on the buttons or those who cannot read, are also foreclosed from much of the information presented by touch screen systems. It can be appreciated that the use of buttons, keyboards, or other mechanical controls in conjunction with a touch screen system may be of significant assistance to those persons with disabilities. However, in many touch screen systems, the addition of buttons, keyboards, or other mechanical controls is limited by a lack of space, expense, or various other constraints. Hence, it would be desirable to provide a device for improving access to the functions of HMIs for people with disabilities.

Therefore, it is a primary object and feature of the present invention to provide an interface system for tactile manipulation of a touch screen for people with disabilities which provides appropriate tactile marking for the action they wish to carry out and which provides a user with the sensation that an actual button is being pressed.

It is a further object and feature of the present invention to provide an interface system for improving access to the functions of HMIs for people with disabilities that is simple to use and inexpensive to manufacture.

It is a still further object and feature of the present invention to provide an interface system that includes a device for improving access to the functions of HMIs for people with disabilities that may be utilized without altering operation of the HMIs or the electronic devices controlled by the HMIs.

In accordance with the present invention, an interface system for allowing cross-disability manipulation of a computer touch screen that is operably connected to an electronic computer is provided. A software program is stored on the computer and the computer and computer touch screen can be incorporated into a kiosk. The interface system includes a tactile button assembly that can be used for manipulating the touch screen, without requiring the user to physically touch graphically displayed virtual buttons on the computer touch screen. The tactile button assembly extends over at least a portion of the computer touch screen and includes at least one tactile button that has tactile indicia that can be tactilely perceived by a user. The tactile button(s) can be moved between a non-actuated position and an actuated position and includes a contact end. In the non-actuated position of the tactile button(s), the contact end is spaced from the computer touch screen. In the actuated position of the tactile button(s), the contact end is relatively closer to and may contact the computer touch screen.

In accordance with another aspect of the present invention, the computer touch screen defines a virtual button that is graphically displayed on the computer touch screen. The virtual button can be seen by a user with sight, thus be within a line-of-sight view of the user, and can be touched by a finger of the user to perform a predetermined task of the software program. A hidden button is defined upon the computer touch screen and is arranged so that at least a portion of the hidden button underlies at least a portion of the tactile button, thus being at least partially covered from line-of-sight view of the user, and arranged so that the tactile button contact end contacts the hidden button when the tactile button is in the actuated position for performing the predetermined task of the software program. In this way, the same task that can be performed by pressing the virtual button can also be performed by pressing the tactile button.

In accordance with another aspect of the present invention, the tactile button assembly includes a panel that supports the tactile button at a support end of the button that is opposite the contact end of the tactile button. The support end of the tactile button can be transversely spaced from the computer touch screen so that the support end of the tactile button does not overlie the computer touch screen.

The support end of the tactile button can be fixed with respect to the panel so that the contact end of the tactile button is arranged in a cantilevered manner with respect to the panel. An intermediate portion of the tactile button that extends between the tactile button support and contact ends can be configured to bend while the tactile button moves between the non-actuated and actuated positions so that the tactile button actuates like a diving board with its own material providing a biasing force that tends to return the tactile button to the non-actuated position. Alternatively, a pivot connection can be provided between the tactile button support end and the panel, and that defines a pivot axis about which the tactile button pivots when moving between the non-actuated and actuated positions. A spring can be arranged between the tactile button and the panel that biases the tactile button toward the non-actuated position.

In accordance with another aspect of the present invention, a bezel extends about and outwardly from a perimeter of the computer touch screen and the panel of the tactile button assembly is mounted to the bezel. The panel can be non-permanently mounted to the bezel by way of, for example, adhesives, magnetic fasteners, hook and loop fasteners, or other non-permanent mounting techniques that may allow the interface system to be retrofitted to existing kiosks and other touch screen systems that are currently in use. The panel can also be permanently or semi-permanently mounted to the bezel by way of, for example, screws, pins, or adhesives. It could also be molded directly into the bezel for such permanent mounting.

In accordance with another aspect of the present invention, the tactile button assembly panel includes a front portion that is proximate the computer touch screen, a back portion that is distal the computer touch screen, and an intermediate portion that extends between the front and back portions. The intermediate portion includes slots extending therethrough and multiple tactile buttons are respectively arranged within the slots of the panel intermediate portion. The panel front portion can include slots that are interconnected with the slots of panel intermediate portion. The contact ends of the tactile buttons can be arranged to move within the slots of the panel front portion while the tactile buttons move between the non-actuated and actuated positions.

In accordance with another aspect of the present invention, the panel front portion may include at least one hook that engages a bezel of the kiosk and provide registration and alignment of the tactile button assembly and thus the contact end(s) of the button(s) with the hidden button(s), without the at least one hook touching the screen. Multiple hooks may be defined on the panel front portion to provide and maintain registration and alignment of the tactile button assembly from multiple locations of engagement with the kiosk bezel. Pairs of hooks may be provided on opposing sides of the tactile buttons so that the panel can be supported at multiple engagement locations with the bezel and lower surfaces of the hooks may be spaced from but closely adjacent to the screen, which may help prevent objects other than the contact ends of the tactile buttons from contacting the hidden buttons and may protect the movable contact ends of the tactile buttons.

In accordance with another aspect of the present invention, the contact ends of the tactile buttons may include resilient tips that are made from a resilient material, such as an elastomeric material. For some types of touch screen technology, such as capacitive touch screens, the resilient material would be electrically conductive. The resilient tips can be molded to the contact ends of the tactile buttons. This may be done by way of co-molding, dual-injection or over-molding a resilient material over the contact ends of the tactile buttons.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF THE DRAWINGS

Figure 1:
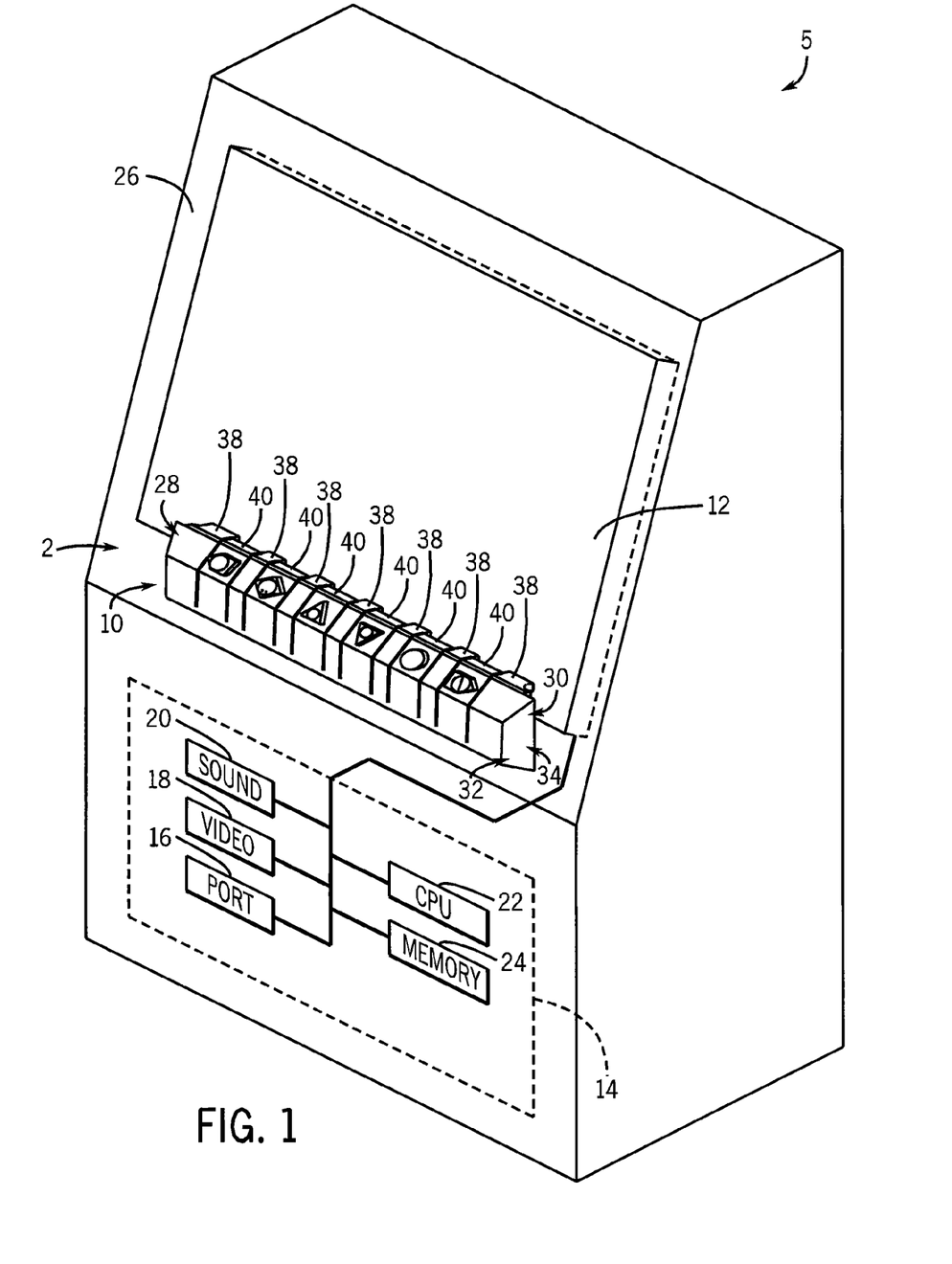
FIG. 1 is a pictorial view of a schematic representation of a kiosk incorporating an interface system in accordance with the present invention.

Referring to FIG. 1, an interface system in accordance with the present invention is generally designated by the reference numeral 2 as implemented on a kiosk 5 having a touch screen interface. It is understood that the interface system 2 may be implemented on other public systems such as ATMs, electronic voting systems, phones, and others that include touch screen interfaces.

Still referring to FIG. 1, interface system 2 includes a tactile button assembly 10 and a computer touch screen shown as touch screen 12. Touch screen 12 includes an underlying computer display that can display graphics, such as video, that provides a user interface for the kiosk 5, and is operably connected to a computer 14. As is known, the touch screen 12 provides a high-resolution X-Y coordinate signal to a central processing unit in response to the touching or "pressing" of the display surface of the touch screen, in a manner hereinafter described. Touch screen 12 can be any of a variety of known suitable touch screens such as surface acoustic wave, capacitive, infrared, and resistive type touch screens. As is known, the touch screen 12 need not be touched, per se, for activation. Instead, the touch screen 12 can be configured to be activated by, for example, a finger or other object that approaches the screen. The touch screen 12 can be optical-based, wherein breaking a beam of light that flows above the surface of the touch screen 12 can activate the touch screen 12. Another suitable touch screen 12 is capacitive and can detect a finger or other object that is near an outer surface of the touch screen 12. Another suitable touch screen 12 is camera-based, wherein a camera can track a finger or other object that is near the outer surface of the touch screen 12. Yet another suitable touch screen 12 is configured to detect changes in light and/or shadow presence when a finger or other object is near. Therefore, it is understood that references to contacting, touching, or the like, touch screen 12 may also include approaching the touch screen 12 so as to active the touch screen 12 in a manner that can execute a predetermined task by the computer 14, as explained in greater detail elsewhere herein.

Still referring to FIG. 1, the computer 14 includes a port 16 for connecting the computer 14 to another computer or other auxiliary device, a video board 18 that is operably connected to the touch screen 12. The computer 14 may include a sound card 20 for generating and transmitting sounds by way of a speaker (not shown) to audibly convey information to a user and may also include a keyboard (not shown). The port 16, video board 18, and sound card 20 are operably connected to a central processing unit 22 that is flexibly tailored to a particular application operating in accordance with a computer software program stored on memory 24. Memory 24 also holds other data and software programs including the software program that will be described in greater detail elsewhere herein. The program may be implemented in a number ways depending on the particular device, and so a functional description of the program will be provided such as would allow it to be readily incorporated into standard electronic devices by one of ordinary skill in the art. The central processing unit 22 and memory 24 cooperate with the video board 18, sound card 20, and touch screen 12 to allow execution of the software program and convey information to users, using the touch screen 12 as an interface for users to control the kiosk 5.

Figure 2:
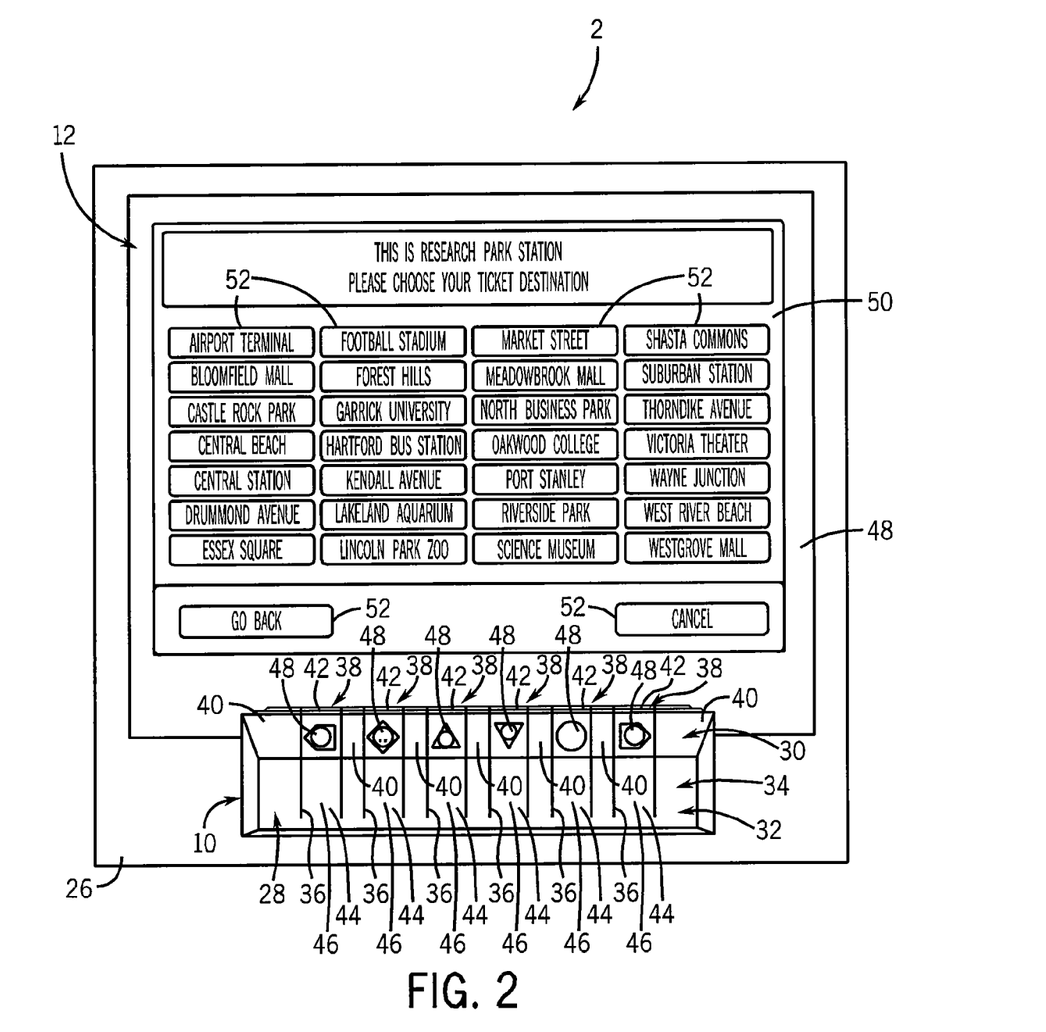
FIG. 2 is a front elevation view of a variant of the interface system of FIG. 1.

Referring now to FIGS. 1 and 2, tactile button assembly 10 is arranged on the kiosk 5 so that the tactile button assembly 10 mostly overlies a kiosk bezel 26 that extends around the touch screen 12 and partially overlies a bottom portion of the touch screen 12. The tactile button assembly 10 can be non-permanently attached to the kiosk bezel 26 by way of, for example, adhesive, hook and loop fasteners, and magnetic fasteners, as explained in greater detail elsewhere herein. Alternatively, the tactile button assembly 10 can be permanently or semi-permanently attached to the kiosk bezel 26 by way of, for example, screws, pins, and adhesive. As another alternative, the tactile button assembly 10 could also be molded or formed as an integral part of kiosk bezel 26.

Still referring to FIGS. 1 and 2, tactile button assembly 10 includes a panel 28 that has a front portion 30 that is proximate to the touch screen 12, shown lying partially over the touch screen 12. A back portion 32 of the panel 28 is arranged generally opposite the front portion 30 and is distal to the touch screen 12, shown as entirely overlying a portion of the kiosk bezel 26. An intermediate portion 34 of the panel 28 extends between the front and back portions 30 and 32. In this way, the front, back, and intermediate portions 30, 32, 34 of this embodiment collectively define a generally rectangular perimeter shape that is bounded by interconnected sides of the panel 28.

Referring now to FIG. 2, the panel 28 includes slots 36 that extend through the front portion 30 and through the intermediate portion 34, so that the slots 36 of the front and intermediate portions 30, 34 are interconnected and define generally rectangular openings in which tactile buttons 38 are arranged. The panel 28 defines legs 40 between adjacent slots 36 and thus also between the corresponding adjacent tactile buttons 38 in the respective slots 36. The legs 40 extend parallel to and are spaced from each other, from the back portion 32 across the intermediate and front portions 34, 30 of the panel 28. The outermost two legs 40, shown at the transverse sides of the panel 28, are shown as being wider than the remaining legs 40 arranged between such outermost legs 40. Each tactile button 38 is arranged between a pair of adjacent legs 40 and includes a contact end 42 that is configured to selectively contact the touch screen 12, as described in greater detail elsewhere herein. Opposite the contact end 42 is a support end 44 that engages and is supported by the panel 28. An intermediate portion 46 extends between the contact and support ends 42, 44, providing the tactile button 38 with a generally rectangular perimeter shape when viewed from above. Each tactile button 38 includes tactile indicia 48 that projects or is recessed from an outer surface of the tactile button 38, so as to allow the tactile indicia 48 to be felt and perceived. The tactile button 38 may itself be recessed, protruding, or level with the surrounding surface. The tactile indicia 48 shown in FIG. 2 projects outwardly from the contact end 42 of the button 38, although the tactile indicia 48 may be provided elsewhere on the tactile button 38, such as the intermediate portion 46 (FIG. 1).

Figure 3:
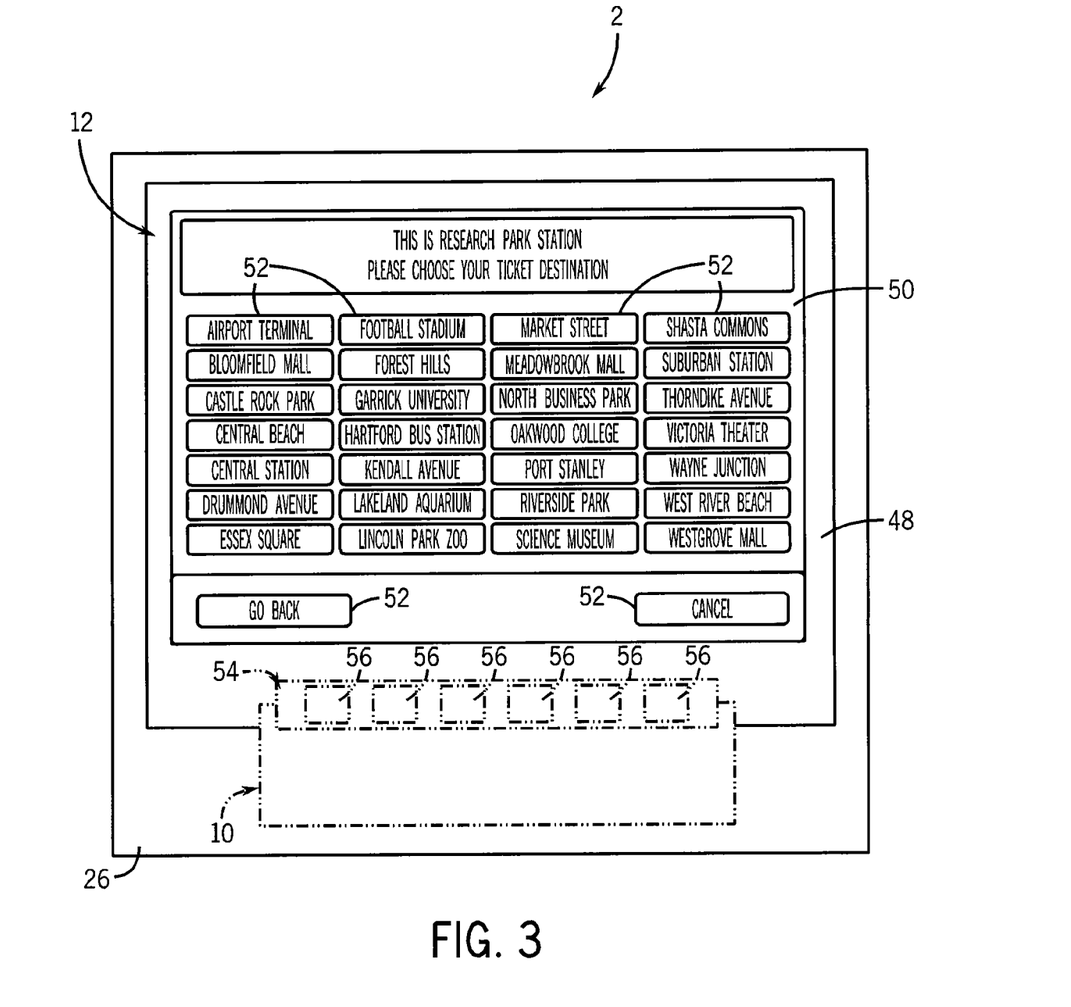
FIG. 3 is a front elevation view of the interface system of FIG. 2, with a portion of the interface system shown in phantom outline.

Referring now to FIGS. 2 and 3, regardless of the particular configuration of the panel 28 and tactile buttons 38, the tactile button assembly 10 may be arranged upon the kiosk 5 to occupy or extend over a relatively small portion of the touch screen 12, for example, less than about 20%, less than about 10%, or less than about 5% of a total surface area of an outer surface 48 of the touch screen 12. Outer surface 48 of the touch screen 12 defines multiple areas upon which video or other graphics can be displayed. The outer surface 48 defines a virtual button area 50 that includes multiple virtual buttons 52 that are displayed thereon in accordance with a computer program executed by the central processing unit 22 (FIG. 1). The virtual button area 50 and thus the virtual buttons 52 are within a line-of-sight view of the user. It is contemplated for the computer program to provide a series of screens that may be displayed in virtual button area 50 in order to divide a user's interaction with touch screen 12 into discrete logical stages. In the depicted environment, each screen includes a plurality of virtual buttons 52 that are generally rectangular images containing an alpha and/or numeric label. Virtual buttons 52 may be "pressed" by a user by touching a portion of outer surface 48 of touch screen 12 that overlies a corresponding desired virtual button on the underlying computer display of the touch screen 12, thereby causing the central processing unit 22 (FIG. 1) to execute a predetermined set of instructions associated with such virtual button 52 and thus perform a predetermined task by way of the computer 14 (FIG. 1). As understood in the art, each virtual button 52 may include a "pressed" and "unpressed" image reflecting its two possible states. Typically, a shadow box surrounds the selected virtual button 52 and changes shade in response to the state thereof so as to mimic a real button being depressed or released.

Referring now to FIG. 3, the tactile button assembly 10 is shown only in phantom outline to reveal the underlying portion of the touch screen 12 that is typically covered by the tactile button assembly 10 during use. Toward the bottom of the touch screen 12, the outer surface 48 defines a hidden button area 54 that includes multiple hidden buttons 56. Thus, the hidden button area 54 and hidden buttons 56 are at least partially covered from line-of-sight view of the user. Accordingly, the hidden buttons 56 need not be graphically displayed through the touch screen 12, but may be graphically displayed, for example, to assist an installer of the tactile button assembly 10 to visually align the contact ends 42 (FIG. 2) of the tactile buttons 38 (FIG. 2) of tactile button assembly 10 with the respective hidden buttons 56. Referring again to FIGS. 2 and 3, the tactile buttons 38 are arranged with respect to the hidden buttons 56 so that when a user presses a tactile button 38, the tactile button 38 moves toward the touch screen 12 until the contact end 42 physically contacts the outer surface 48 of the touch screen 12 at the respective hidden button 56 location. Contacting the outer surface 48 of the touch screen 12 with the contact end of the tactile button 38 causes the central processing unit 22 (FIG. 1) to execute a predetermined set of instructions associated with such hidden button 56 and thus perform a predetermined task by way of the computer 14 (FIG. 1).

Referring again to FIG. 3, the task performed when a hidden button 56 is contacted with the tactile button 38 may be the same as a task that can be performed when a virtual button 52 is pressed with a finger of a user. Optionally, contacting the hidden buttons 56 performs different tasks than those associated with the virtual buttons 52. It is contemplated for hidden buttons 56 to allow a user who has difficulty reading the information in virtual button area 50 to navigate through and thus control the screen and the selection of virtual buttons 52 displayed in virtual button area 50. For example, pressing one of the tactile buttons 38, which correspondingly contacts a respective one of the hidden buttons 56, may allow a user to scroll backwards through the plurality of screens displayed in the virtual button area 50. Depressing another one of the tactile buttons 38, which correspondingly contacts another respective one of the hidden buttons 56, may activate an audio cue that assists an individual with vision impairment or the individual who has difficulty reading the information displayed in the virtual button area 50 to receive information on the capabilities of and the instructions for operation of virtual buttons 52 displayed in the virtual button area 50.

Figure 4:
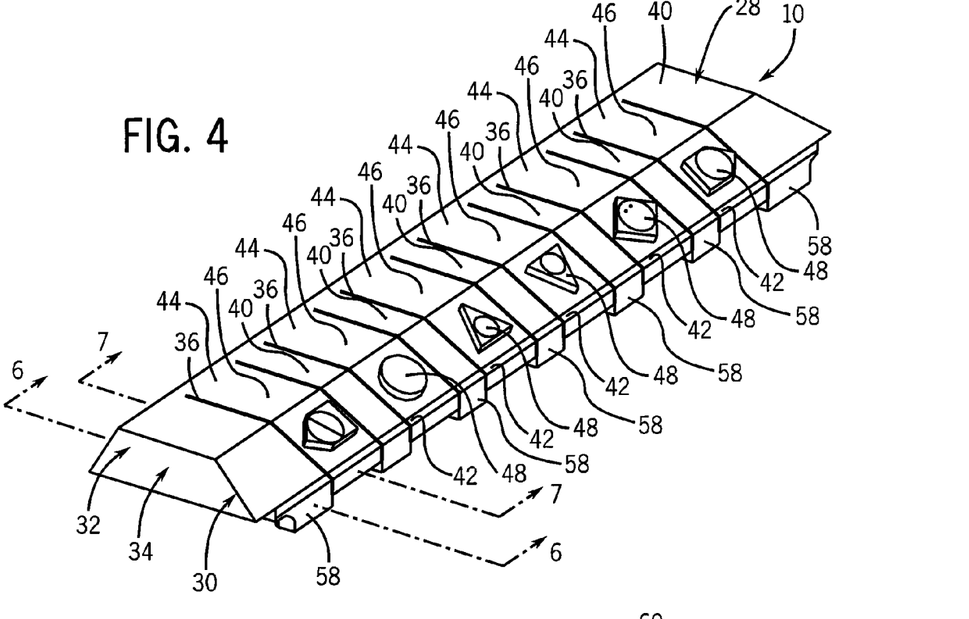
FIG. 4 is a pictorial view, from above, of the tactile button assembly of FIG. 2.

Referring now to FIG. 4, to ensure that the tactile button assembly 10 can align properly with the hidden button area 50 of the touch screen 12, the tactile button assembly 10 is configured to correspond to the particular configuration of the kiosk 5 onto which the tactile button assembly 10 will be installed. The front portion 30 of the panel 28 and the contact ends 42 of the tactile buttons 38 are slanted with respect to the intermediate portions 34, 46 of the panel 28 and tactile buttons 38, respectively. Such slant is shown as being about 30 degrees, although other angles of slant may be provided such as less that about 60 degrees, less that about 45 degrees, less than about 35 degrees, less than about 20 degrees, less than about 15 degrees, or zero degrees, depending on the particular angular arrangement of the touch screen 12 with respect to a surface of the kiosk bezel 26 or other portion of the kiosk 5 to which the tactile button assembly 10 may be mounted.

Figure 5:
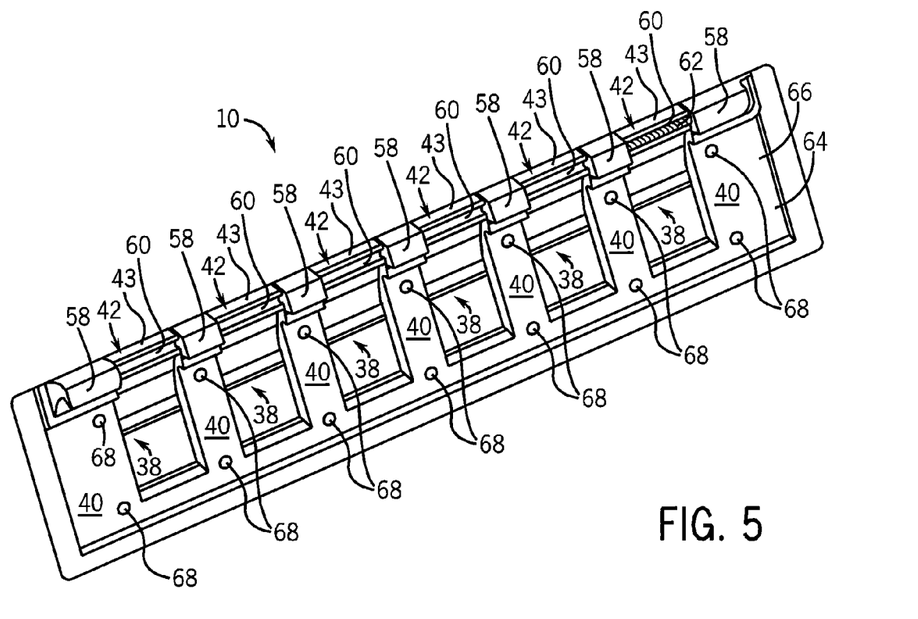
FIG. 5 is a pictorial view, from below, of the tactile button assembly of FIG. 2.
Figure 6:
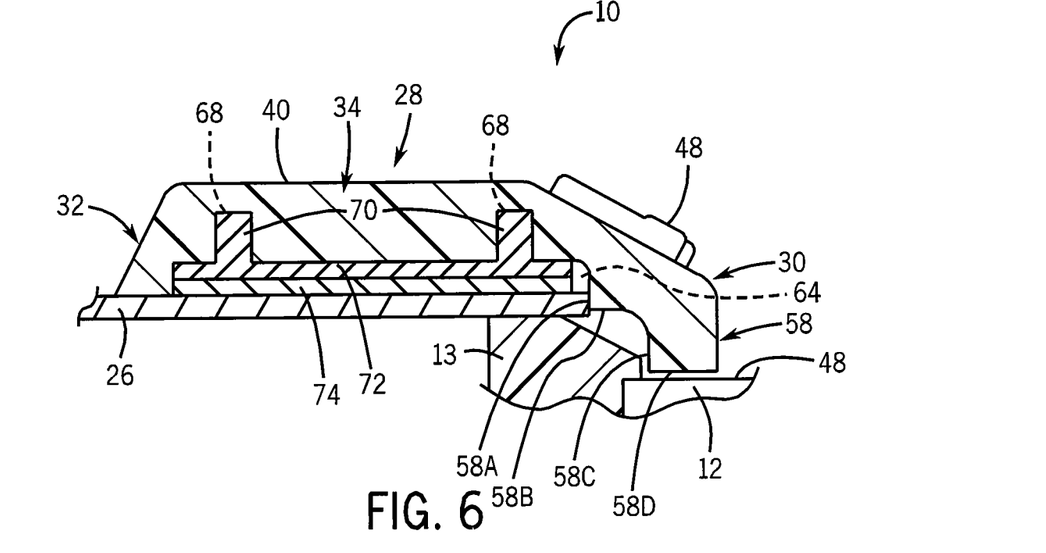
FIG. 6 is a cross-sectional view of the tactile button assembly taken along line 6-6 of FIG. 4.
Figure 7:
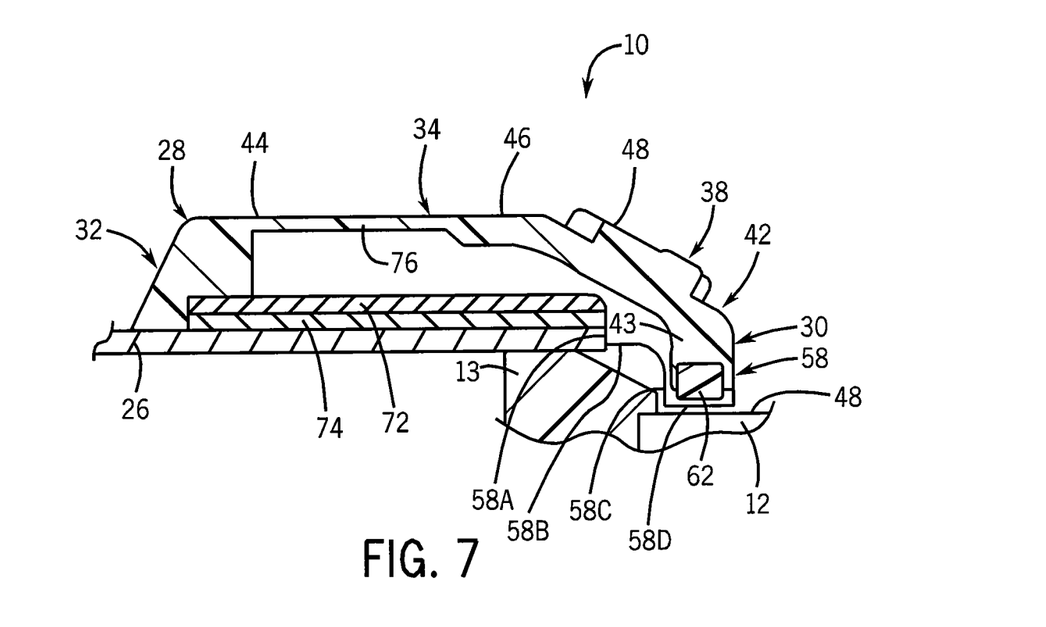
FIG. 7 is a cross-sectional view of the tactile button assembly taken along line 7-7 of FIG. 4.

Referring now to FIGS. 4 and 5, the front portion 30 of the panel 28 includes at least one hook 58 and is shown in FIGS. 4 and 5 as having multiple hooks 58. The hooks 58 are spaced from each other and extend downwardly from the legs 40 at the front portion 30 of the panel 28. Pairs of hooks 58 are arranged on opposing sides of the intermediate tactile buttons 38. In this arrangement, the hooks 58 serve as barriers that can protect the movable contact ends 42 of the tactile buttons 38 from damage by preventing contact with the movable contact ends 42 from opposing sides. As shown in FIGS. 6 and 7, the hook 58 also provides registration and alignment of the tactile button assembly 10 upon the kiosk 5 (FIG. 1). This is done by the hook(s) 58 engaging the kiosk bezel 26 to mechanically position the tactile button assembly 10 with respect to the touch screen 12 so that the contact ends 42 are aligned with the hidden buttons 56 (FIG. 3).

Still referring to FIGS. 6 and 7, hook 58 includes a first shoulder 58A that engages the kiosk bezel 26. A transition segment 58B extends generally perpendicularly from the first shoulder 58A, further along the panel front portion 30, and curves downwardly to connect to a second shoulder 58C. The second shoulder 58C extends parallel to and downwardly past the first shoulder 59A. The transition segment 58B and the second shoulder 59C are shown as providing a clearance between the hook 58 and a touch screen bezel 13 that extends about the touch screen 12. It is understood that the second shoulder 59C may engage the touch screen bezel 13 or even the kiosk bezel 26, in yet another embodiment. Regardless, the hook 58 is typically configured so that a lower surface 58D is spaced from the outer surface 48 of the touch screen 12.

Referring now to FIGS. 5 and 7, between the hooks 58, the contact ends 42 of the tactile buttons 38 each includes a contact foot 43 that extends from an angled portion of the contact end 42, generally perpendicularly with respect to the touch screen 12 (FIG. 7). A resilient tip 62 is arranged at the end of the contact foot 43. The resilient tip 62 is made from an elastomeric or other suitably resilient material. When the touch screen 12 is a capacitive touch screen, the resilient tip 62 can be made from an electrically conductive rubber material and/or other suitably electrically conductive material. When the touch screen 12 is a surface acoustic wave touch screen, the resilient tip 62 is made from a resilient material that is soft enough to damp the ultrasonic waves when the resilient tip 62 contacts the touch screen 12 during use.

As shown in FIG. 5, the resilient tip 62 in this embodiment is held in a groove 60 that extends in a transverse direction across a bottom surface of the contact foot 43 of the tactile button 38. The groove 60 may have a curved, for example, a semi-circular cross-sectional perimeter shape. The resilient tip 62 of this embodiment may have a columnar configuration with a circular cross-sectional perimeter shape and can be held in the groove 60, shown in the groove 60 toward the right-hand side of FIG. 5, by way of a friction fit or an adhesive.

Referring now to FIG. 7, in a typical implementation, the resilient tip 62 is molded to the end of the contact foot 43 of the tactile button 38. The resilient tip 62 can be molded to the contact foot 43 by way of, for example, co-molding, dual-injection molding or over-molding the resilient material onto the material of the contact end 43 of the tactile button 38. It is understood that the resilient tip 62 may be molded onto the contact end 43 of the tactile button 38 so as to cover or encapsulate the entire periphery of the contact end 43. The resilient tips 62 may present a flat lower surface or the resilient tips 62 may define rounded or conical shapes. For some types of touch screens 12 such as resistive touch screens 12, a soft or resilient tip 62 is not required, so the tip need not be made from an elastomeric or other resilient material but instead may be made from a hard material. In such embodiment, a tip of the contact foot 43, itself, may provide the surface that directly touches the touch screen 12.

Referring now to FIGS. 5 and 6, a cavity 64 extends into a bottom surface 66 of the panel 28. Holes 68 that are spaced from each other extend into the bottom surface 66 of the panel 28 into the legs 40. The holes 68 receive posts 70 that are connected to a mounting plate 72 (FIG. 6) which is received in the cavity 64. As shown in FIGS. 6 and 7, the mounting plate 72 is adhered to a magnetic plate 74 that can magnetically engage the kiosk bezel 26, for implementations in which the kiosk bezel 26 is made from a ferrous material. For other implementations in which the kiosk bezel 26 is not made from a ferrous material but is instead made from, for example, a polymeric material, the mounting plate 72, itself, can be made from a ferrous material. In such embodiment, the magnetic plate 74 may be adhered to the kiosk bezel 26 or other portion of the kiosk 5 to which the tactile button assembly 10 will be mounted. Regardless, the magnetic engagement of the magnetic plate 74 and the kiosk bezel 26 or mounting plate 72 allow for non-permanent mounting of the tactile button assembly 10 to the kiosk 5. Other non-permanent mounting of the tactile button assembly 10 to the kiosk 5 can be done by way of adhesives, hook and loop fasteners, and other fasteners. The tactile button assembly 10 can also be permanently mounted to the kiosk bezel 26 by way of, for example, screws, pins, or permanent adhesives. The tactile button assembly 10 or its components such as the panel 28 could also be molded directly into the kiosk bezel 26 for such permanent mounting.

Referring now to FIGS. 4, 5, and 7, the support end 44 of the tactile button 38 is fixed, shown as integral with, the panel 28. The tactile button 38 extends through the slot 36 and over the cavity 64 so that the contact end 42 of the tactile button 38 is supported in a cantilevered manner from the back portion 32 of the panel 28. A thinned segment 76 (FIG. 7) is defined at the intermediate portion 46 and support end 44 of the tactile button 38. The thinned segment 76 begins at about a midway point along the length of the intermediate portion 46, tapering down from a relatively thicker remainder of the intermediate portion 46, and extends longitudinally to the support end 44 of the tactile button 38. The tactile button 38 is made from a polymeric material that can provide a restorative force that biases the tactile button 38 from an actuated position to a non-actuated position. In the actuated position, the resilient tip 62 of the contact end 42 contacts the touch screen outer surface 48 as a downward force is applied to the tactile button 38, for example, to the tactile indicia 48, in a direction that faces the touch screen 12. In the non-actuated position, the resilient tip 62 of the contact end 42 is spaced from the touch screen outer surface 48 as is shown in FIG. 7 and the upper surfaces of the tactile button 38 and legs 40 (FIG. 4) may be generally coplanar. This allows the tactile button 38 to actuate like a diving board, providing a resistive feel to the user which simulates a sensation of an actual button, while automatically returning to the non-actuated position due to the restorative biasing force of the material from which the tactile button 38 is made, without using an ancillary spring to provide the biasing force.

Figure 8:
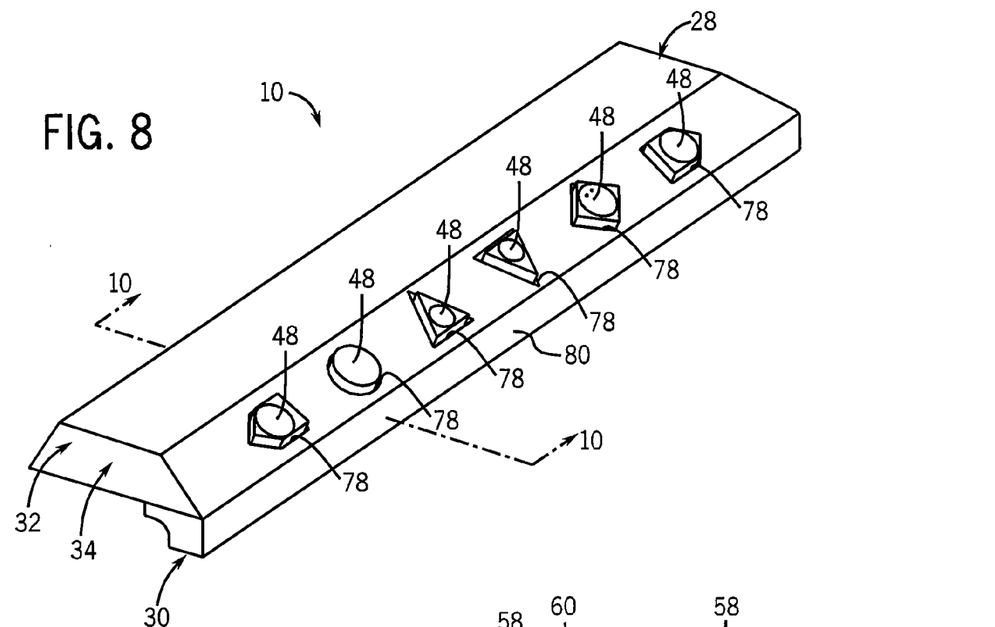
FIG. 8 is a pictorial view, from above, of another variant of the tactile button assembly of FIG. 2.
Figure 9:
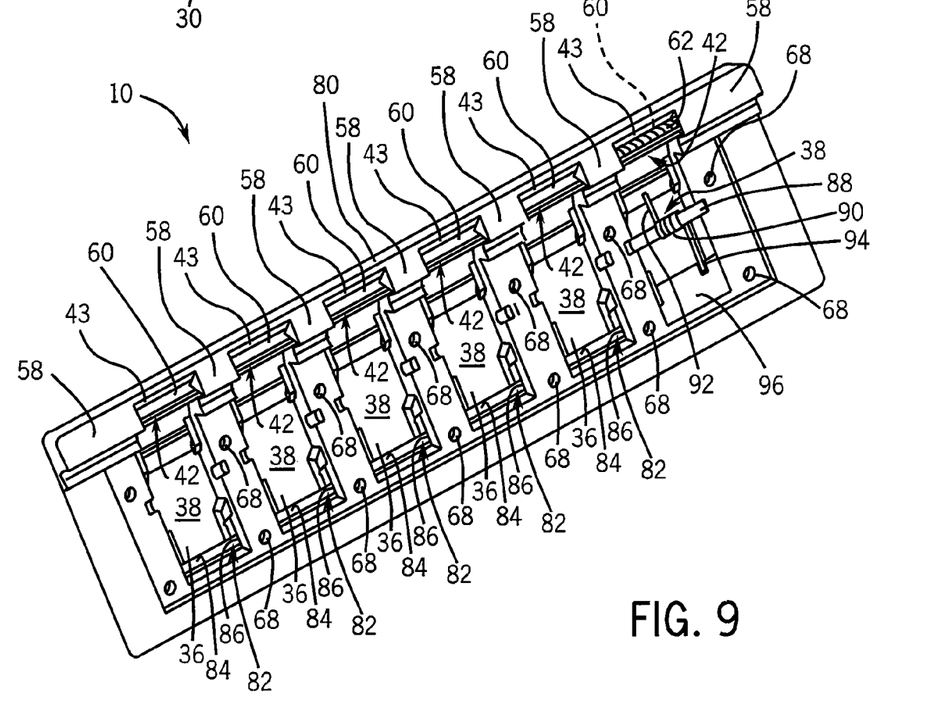
FIG. 9 is a pictorial view, from below, of the tactile button assembly of FIG. 8.
Figure 10:
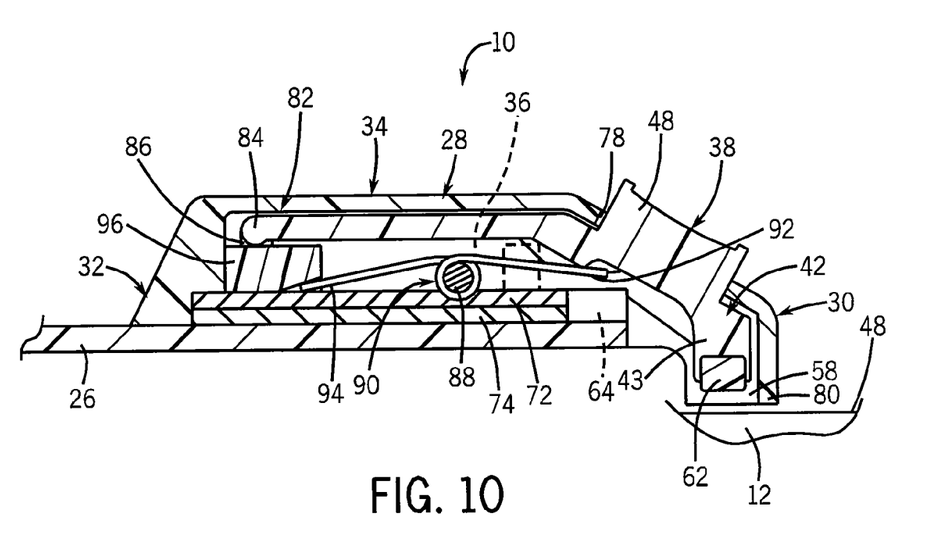
FIG. 10 is a cross-sectional view of the tactile button assembly taken along line 10-10 of FIG. 8.

Referring now to FIGS. 8-10, the tactile button assembly 10 may be configured to bias using a spring instead of the material of the tactile button 38 itself. The tactile button assembly 10 of FIGS. 8-10 is mostly identical to those described about with respect to FIGS. 1-7, whereby such descriptions are applicable here with respect to the tactile button assembly 10 of FIGS. 8-10. The tactile button assembly 10 of FIGS. 8-10 differs from those in FIGS. 1-7 in the following ways. Referring to FIG. 8, the panel 28 has no discernible legs 40 (FIG. 4) when viewed from above, but instead presents substantially continuous interconnected surfaces that include spaced-apart openings 78 at the front portion 30 of the panel 28. The openings 78 have perimeter shapes that correspond to those of respective tactile indicia 48, and the tactile indicia 48 extends upwardly through the openings 78. The panel 28 includes a lip 80 that extends continuously across the panel 28 at the front portion 30, in front of the hooks 58 (FIG. 9), so that like the hooks 58, the lip 80 is spaced from the touch panel outer surface 48.

Referring now to FIGS. 9 and 10, the tactile buttons 38 shown here are pivot mounted and spring actuated. A pivot connection 82 is defined at an engagement of the support end 44 of the tactile button 38 and the panel 28. Each of the tactile buttons 38 includes a hinge pin 84 at its support end 44 and the ends of the hinge pin 84 are held in receptacles 86 of the panel 28. The hinge pin 84 defines a pivot axis about which the tactile button 38 pivots when moving between the non-actuated and actuated positions. A spring pin 88 extends transversely across the slot 36, parallel to the hinge pin 84, and is spaced below a downwardly-facing surface of the tactile button 38, as can be seen in FIG. 10. The spacing between the spring pin 88 and the tactile button 38 provides a clearance through which the tactile button 38 can travel while moving from the non-actuated position shown in FIG. 10 to the actuated position. A spring 90 is concentrically arranged on the spring pin 88 and has a front end 92 that engages a lower surface of the downwardly slanting portion of the contact end 42 of the tactile button 38. A back end 94 of the spring 90 is captured between the mounting plate 72 and a block 96 that extends into the slot 36 and supports the hinge pin 84 from below. In this way, the tactile button 38 is preloaded by a pretensioned state of the spring 90 that, at rest, holds the tactile button in the non-actuated position so that an upper surface of the tactile button 38 may abut a downwardly facing surface of the panel 28. The pretensioning of the spring 90 can be of a sufficient value so as to apply an upward force to the tactile button 38 that cannot be overcome by light touches but may instead depress suddenly when a threshold force is exceeded so as to provide a click-like feel instead of gradual movement, so as to provide tactile feedback to the user that the button has been pressed.

The spring actuation and pretensioning of the tactile button 38 can be accomplished with other spring-like devices, including those that do not require a spring pin 88. Examples of such other spring-like devices include poly-domes that can be arranged under the tactile button 38 to hold the tactile button 38 in the non-actuated position and that may buckle when the tactile button 38 is depressed so as to provide tactile feedback to the user that the button has been pressed. Another example of a spring-like device is a spring bent from a flat piece of metal, such as sheet springs that are stamped and bent, similar to a leaf-spring configuration. It is also contemplated that the tactile button 38, optionally, the entire tactile button assembly 10, may be entirely provided over the hidden button area 54 as a touch screen 12 mounted implementation, provided that the touch screen outer surface 48 is sufficiently large in surface area to accommodate without unduly compromising the available space for the virtual button area 50.

As described, the present invention allows for tactile manipulation of the touch screen 12 for users with disabilities, for example, users with impaired vision, so as to provide appropriate tactile marking for the action they wish to carry out. The tactile button assembly 10 may provide a relatively low, slim profile that minimally influences an overall aesthetic appearance of the kiosk 5 and may provide users with the sensation that actual buttons are being pressed, similar to a keyboard or keypad. The tactile button assembly 10 provides a system through which users with disabilities can press buttons on the touch screen 12 by way of the tactile buttons 48 that serve as intermediary lever type buttons, whereby the users can press buttons on the touch screen 12 without physically contacting the screen with their fingers. Users with low vision and blindness can use touch screen 12 by virtue of the combination of visible on-screen virtual buttons and tactile buttons 48 that selectively contact the touch screen 12. Audio output is available to read onscreen text and labels to users who require it. For people in a wheelchair or those with shorter stature, the tactile button assembly 10 may be provided across the bottom of touch screen 12 and can be made within the reach standards of the Americans with Disabilities Act Accessibility Standards.

Various modes of carrying out the invention are contemplated as being within the scope of the following claims particularly pointing out and distinctly claiming the subject matter, which is regarded as the invention.

We claim:

1. An interface system for allowing cross-disability manipulation of a computer touch screen that is operably connected to an electronic computer having a software program stored thereon, comprising:
   a bezel
   a computer touch screen housed in the bezel;
   a tactile button assembly operatively connected to the bezel and including a panel and a tactile button having a support end operatively connected to panel, an intermediate portion extending from the panel over at least a portion of the computer touch screen and a contact end, the tactile button including tactile indicia that can be tactilely perceived by a user and being moveable between a non-actuated position wherein the contact end is spaced from and supported above the computer touch screen by the panel in a cantilevered arrangement and an actuated position wherein the contact end of the tactile button is relatively closer to the computer touch screen than when the tactile button is in the non-actuated position.

2. The interface system of claim 1 wherein the computer touch screen defines:
   a virtual button that is graphically displayed on the computer touch screen so that the virtual button is arranged within a line-of-sight view of the user and can be touched by a finger of the user to perform a predetermined task of the software program; and
   a hidden button that is defined upon the computer touch screen is arranged so that at least a portion of the hidden button underlies at least a portion of the tactile button so that the tactile button contact end contacts the hidden button when the tactile button is in the actuated position to perform a predetermined task of the software program.

3. The interface system of claim 1 wherein the support end of the tactile button is transversely spaced from computer touch screen so as to not overlie the computer touch screen.

4. The interface system of claim 1 wherein the support end of the tactile button is fixed with respect to the panel, and wherein an intermediate portion of the tactile button that extends between the support and contact ends thereof is configured to bend while the tactile button moves between the non-actuated and actuated positions.

5. The interface system of claim 1 wherein a pivot connection is defined between the support end of the tactile button and the panel so that the contact end of the tactile button is arranged to pivot about an axis defined at the pivot connection while the tactile button moves between the non-actuated and actuated positions.

6. The interface system of claim 5 wherein a spring is arranged with respect to the tactile button so as to bias the tactile button toward the non-actuated position.

7. The interface system of claim 1 wherein the panel that extends from the computer touch screen outwardly past the computer touch screen so that at least a portion of the panel does not overlie the computer touch screen.

8. The interface system of claim 7 wherein the panel defines an inwardly facing surface that is attached to the bezel.

9. The interface system of claim 7 wherein the panel includes a front portion that is proximate the computer touch screen, a back portion that is distal the computer touch screen, and an intermediate portion that extends between the front and back portions, the intermediate portion including a slot that extends therethrough and wherein a tactile button is arranged within the slot of the panel intermediate portion.

10. The interface system of claim 9 wherein the panel front portion includes a slot that is interconnected with the slot of the panel intermediate portion and wherein the contact end of the tactile button moves within the slot of the panel front portion during movement of the tactile button between the non-actuated and actuated positions.

11. The interface system of claim 1 wherein the tactile button assembly includes multiple tactile buttons and wherein multiple hidden buttons are defined on the computer touch screen at locations that respectively underlie the contact ends of the multiple tactile buttons so that each of the multiple hidden buttons can be contacted by a contact end of a respective one of the multiple tactile buttons when the tactile button is in the actuated position for performing a predetermined task of the software program.

12. The interface system of claim 11 wherein the panel of the tactile button assembly including at least one hook that engages the bezel so as to maintain alignment between the contact ends of the multiple tactile buttons and the hidden buttons.

13. The interface system of claim 1 wherein the contact end of the tactile button includes a resilient tip that is made from a resilient material that is attached to the contact end and that contacts the computer touch screen when the tactile button is in the actuated position.

14. The interface system of claim 13 wherein the resilient material is electrically conductive.

15. The interface system of claim 14 wherein the computer touch screen is a capacitive touch screen.

16. The interface system of claim 13 wherein the resilient material is at least one of molded into and molded over the contact end of the tactile button.

17. The interface system of claim 13 wherein the computer touch screen is an acoustic touch screen.

18. The interface system of claim 1 wherein the computer touch screen is one of an infrared touch screen, a resistive touch screen, an optical-based touch screen, and a camera-based touch screen.

19. An interface system for providing cross-disability use of a computer touch screen that is operably connected to an electronic computer having a software program stored thereon, comprising:
   a bezel;
   a computer touch screen housed in the bezel and defining a virtual button area having multiple virtual buttons that are graphically displayed on the computer touch screen so that each of the virtual buttons is within a line-of-sight view of a user and can be pressed by a finger of the user to perform a predetermined task of the software program, and a hidden button area having multiple buttons that are at least partially covered from a line-of-sight view of the user; and
   a tactile button assembly operatively connected to the bezel, extending over the hidden button area of the computer touch screen and including multiple, actuatable tactile buttons, each of the tactile buttons including tactile indicia that can be tactilely perceived by the user and wherein each of the tactile buttons can move between a non-actuated position and an actuated position, each of the tactile buttons including a supported end, an intermediate portion extending from the supported end over at least a portion of the computer touch screen and a contact end that is arranged to selectively contact a respective one of the hidden buttons when the tactile button is moved from the non-actuated position to the actuated position for performing a predetermined task of the software program, the contact end of the tactile button being spaced from and supported above the computer touch screen in a cantilevered arrangement when the tactile button is in the non-actuated position.

20. A tactile button assembly for allowing cross-disability manipulation of a computer touch screen that is operably connected to an electronic computer having a software program stored thereon, the computer touch screen housed in a bezel, the tactile button assembly comprising:

a panel connectable to the bezel for supporting the tactile button assembly with respect to the computer touch screen; and at least one actuatable tactile button being configured to move with respect to the panel between a non-actuated position and an actuated position, each of the one actuatable tactile button:

having a supported end operatively connected to the panel, an intermediate portion extending from the panel and a contact end being spaced from and supported above the computer touch screen in a cantilevered arrangement when the tactile button is in the non-actuated position; and including tactile indicia that can be tactilely perceived by a user;

wherein the at least one tactile button is relatively further from the computer touch screen in the non-actuated position and the at least one tactile button is relatively closer to the computer touch screen in the actuated position.

21. The tactile button assembly of claim 20 wherein the computer touch screen includes at least one virtual button that is graphically displayed on the computer touch screen so that the at least one virtual button is arranged within a line-of-sight view of a user and can be touched by a finger of the user for activating the touch screen; and at least one hidden button that is defined upon the computer touch screen and that underlies at least a portion of the tactile button assembly so that when the at least one the tactile button is in the actuated position, the at least one tactile button can activate the touch screen.

* * * * *